US009586540B2

(12) United States Patent
Kim et al.

(10) Patent No.: US 9,586,540 B2
(45) Date of Patent: Mar. 7, 2017

(54) CABLE ANCHORING DEVICE

(71) Applicant: KYUNG CHANG INDUSTRIAL CO., Ltd., Daegu (KR)

(72) Inventors: Kyu-Jung Kim, Daegu (KR); Gi-Won Bae, Daegu (KR)

(73) Assignee: KYUNG CHANG INDUSTRIAL CO., Daegu (KR)

( * ) Notice: Subject to any disclaimer, the term of this patent is extended or adjusted under 35 U.S.C. 154(b) by 0 days.

(21) Appl. No.: 14/958,844

(22) Filed: Dec. 3, 2015

(65) Prior Publication Data

US 2016/0167600 A1    Jun. 16, 2016

(30) Foreign Application Priority Data

Dec. 15, 2014  (KR) .......................... 10-2014-0180399

(51) Int. Cl.
*F16L 3/08*      (2006.01)
*B60R 16/02*     (2006.01)

(52) U.S. Cl.
CPC ................................ *B60R 16/0215* (2013.01)

(58) Field of Classification Search
CPC ......... B60R 16/0215; F16C 1/105; F16L 3/13
See application file for complete search history.

(56) References Cited

U.S. PATENT DOCUMENTS

| | | | |
|---|---|---|---|
| 4,177,691 A * | 12/1979 | Fillmore | F02D 11/04 74/502.4 |
| 6,364,265 B1 * | 4/2002 | Milligan | A47B 21/0314 108/143 |
| 6,634,252 B2 * | 10/2003 | Mayville | F16C 1/105 74/500.5 |
| 8,312,788 B2 * | 11/2012 | Kwon | F16C 1/105 74/502.4 |
| 2012/0066870 A1 * | 3/2012 | Quaglia | F16C 1/105 24/122.3 |

FOREIGN PATENT DOCUMENTS

| | | |
|---|---|---|
| JP | 2002-122271 A | 4/2002 |
| JP | 2012-102870 A | 5/2012 |
| KR | 2011-0085173 A | 7/2011 |
| KR | 10-1083828 B1 | 11/2011 |

OTHER PUBLICATIONS

Office Action for Korean Patent Application No. KR 10-2014-0180399, Nov. 23, 2015, 5 Pages. (With Concise Explanation of Relevance).
Office Action for Japanese Patent Application No. JP 2015-226410, Nov. 1, 2016, 5 Pages. (With Concise Explanation of Relevance).

\* cited by examiner

*Primary Examiner* — Amy Sterling
(74) *Attorney, Agent, or Firm* — Fenwick & West LLP (57) ABSTRACT

A cable anchoring device may be provided that includes: an anchoring cap which includes a fastening protrusion for the fastening to a bracket; an anchoring socket which includes a first body in which a bracket anchoring groove is formed, and a second body which is inserted into the anchoring cap; and a pressing member which is disposed between the second body and the anchoring cap. When the bracket is inserted into the bracket anchoring groove, the anchoring cap moves by the pressing member, so that the fastening protrusion is inserted into a fastening groove of the bracket.

5 Claims, 14 Drawing Sheets

CABLE ANCHORING DEVICE

CROSS-REFERENCE TO RELATED APPLICATION

This application claims priority under 35 U.S.C. §119(a) to Republic of Korean Patent Application No. 10-2014-0180399 filed on Dec. 15, 2014, which is incorporated by reference herein in its entirety.

BACKGROUND

Field

The present invention relates to a cable anchoring device which is coupled to a bracket of a vehicle.

Description of Related Art

A cable anchoring device is used to anchor various control cables inside a vehicle, and the like.

Generally, a plurality of various kinds of cables are installed in machinery such as a vehicle, etc. Here, for the purpose of preventing the cable installed in the machinery such as a vehicle, etc., from being bent or being worn out due to friction, a cable anchoring device guiding the cable is employed. Here, by using the cable anchoring device, the cable is coupled to a bracket fixed to the body of the vehicle. Particularly, a cable anchoring device to be fastened to a U-shaped bracket has a fixed protrusion shape.

However, the size or the number of parts of a conventional cable anchoring device is determined according to whether the conventional cable anchoring device is rotary or non-rotary. When the cable anchoring device is rotary, separate parts for rotation are added. Therefore, the number of the parts is increased and the size becomes larger. Also, the shape of the conventional cable anchoring device is determined according to the part and operation principle thereof. Regarding the cable anchoring device having a fixed protrusion shape, when the cable anchoring device is fastened to the bracket, the cable anchoring device comes to protrude to the outside due to the fixed protrusion shape, and thus, is transformed and damaged by interference collision.

Accordingly, it became necessary to research the cable anchoring device which is not transformed and damaged by interference collision without adding separate components.

SUMMARY

One embodiment is a cable anchoring device including: an anchoring cap which includes a fastening protrusion for the fastening to a bracket; an anchoring socket which includes a first body in which a bracket anchoring groove is formed, and a second body which is inserted into the anchoring cap; and a pressing member which is disposed between the second body and the anchoring cap. When the bracket is inserted into the bracket anchoring groove, the anchoring cap moves by the pressing member, so that the fastening protrusion is inserted into a fastening groove of the bracket.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a cable anchoring device according to an embodiment of the present invention will be described with reference to the accompanying drawings.

Figure 1:
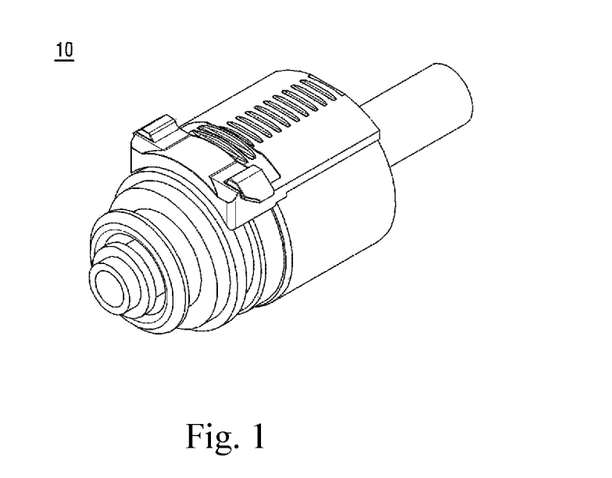
FIG. 1 is a perspective view of a cable anchoring device according to a first embodiment of the present invention.
Figure 2:
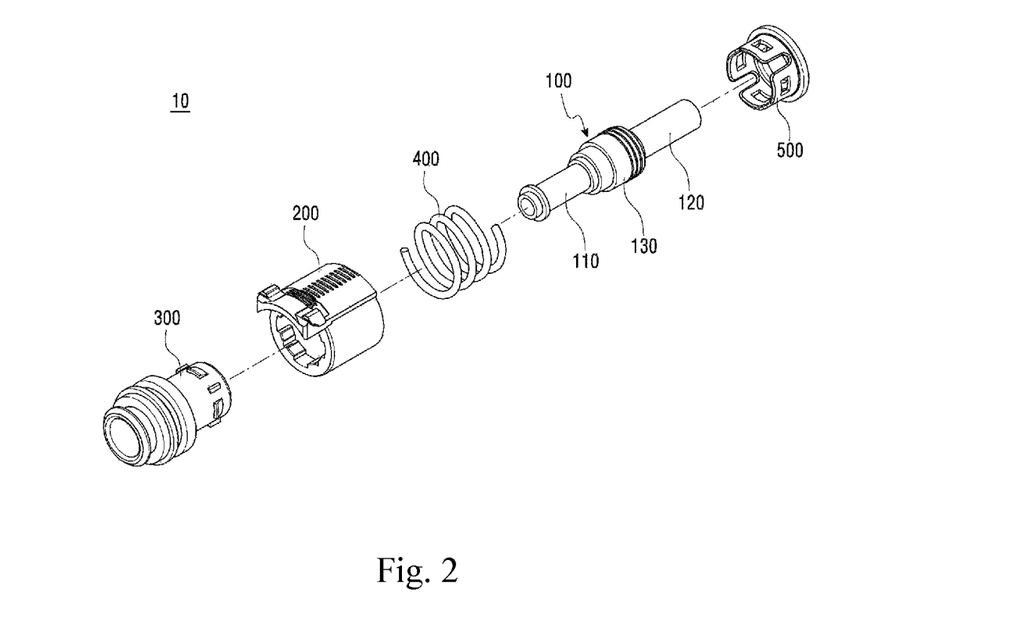
FIG. 2 is an exploded perspective view of the cable anchoring device according to the first embodiment of the present invention.

FIG. 1 is a perspective view of a cable anchoring device according to a first embodiment of the present invention. FIG. 2 is an exploded perspective view of the cable anchoring device according to the first embodiment of the present invention.

Referring to FIGS. 1 and 2, the cable anchoring device 10 according to the first embodiment of the present invention includes an anchoring cap 200, an anchoring socket 300, and a pressing member 400. Also, the cable anchoring device 10 may further include a cable socket 100 and a protecting member 500.

Figure 3A:
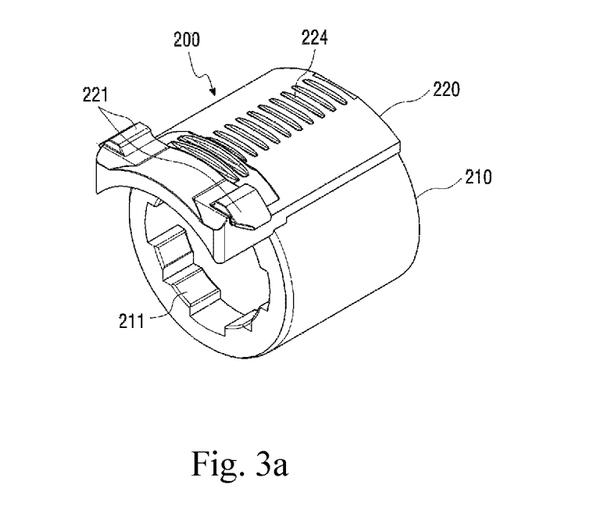
FIGS. 3a and 3b show an anchoring cap according to the first embodiment of the present invention.
Figure 3B:
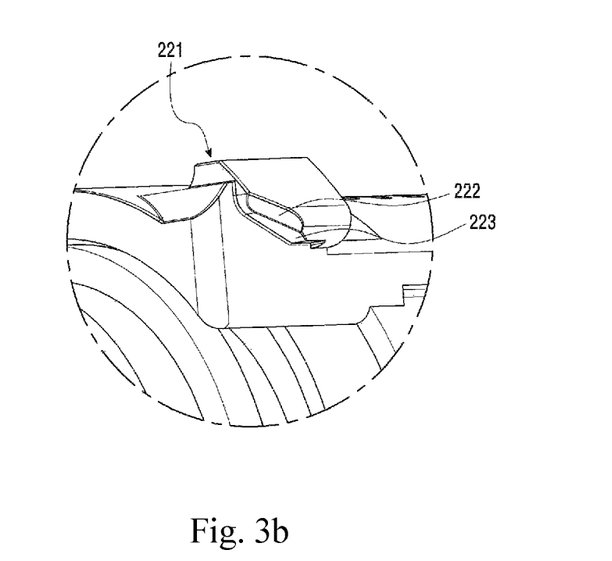

FIGS. 3a and 3b show the anchoring cap according to the first embodiment of the present invention.

Referring to FIG. 3a, the anchoring cap 200 is formed to have a donut-like cylindrical shape. A portion of the anchoring socket 300 is inserted into the anchoring cap 200. Here, the pressing member 400 may be disposed between the anchoring cap 200 and the anchoring socket 300.

Specifically, the anchoring cap 200 includes a body 210 and an anchoring portion 220 for the coupling to a bracket 600 to be described below.

The body 210 includes a fastening hole 211. The fastening hole 211 may be formed to have a shape into which a second body 320 of the anchoring socket 300 is inserted. Specifically, the fastening hole 211 may be formed to have a shape through which a locking protrusion 321 of the second body 320 passes. Accordingly, the body 210 may be disposed in the form of surrounding the second body 320 of the anchoring socket 300.

The anchoring portion 220 may include a fastening protrusion 221. The fastening protrusion 221 may be formed on the front of the anchoring cap 200 and may have a shape corresponding to a fastening groove 610 of the bracket 600. Through this, the fastening protrusion 221 may be inserted into the below-described fastening groove 610 of the bracket 600.

A groove or projection 224 may be formed on a portion of the outer circumferential surface of the anchoring portion 220 at a regular interval. In order to move the anchoring cap 200 in a direction of a below-described anchoring pipe 120 by applying an external force to the anchoring cap 200, it is required to overcome an elastic force of the pressing member 400 disposed between the anchoring cap 200 and the anchoring socket 300. The outer circumferential surface of the anchoring portion 220 to which the external force is applied is in parallel with the direction in which the anchoring cap 200 is intended to be moved. Here, a friction force between the outer circumferential surface of the anchoring portion 220 and an object like a finger, etc., which applies an external force is increased by forming the groove or projection 224 on a portion of the outer circumferential surface of the anchoring portion 220, so that the elastic force of the pressing member 400 is easily overcome, and thus, the anchoring cap 200 can be moved. Therefore, when an external force is applied to the groove or projection 224 formed on a portion of the outer circumferential surface of the anchoring portion 220 for the coupling to the bracket 600, the anchoring cap 200 moves along the direction in which the external force is applied, and when the applied external force is removed, the anchoring cap 200 returns by the elastic force of the pressing member 400 and is fastened to the bracket 600. Here, the outer circumferential surface of the anchoring portion 220 according to the embodiment may have another shape capable of increasing the friction force between the outer circumferential surface and the groove or projection 224.

FIG. 3b is a view showing the enlarged fastening protrusion according to the first embodiment of the present invention.

The fastening protrusion 221 may include at least one inclined surface. Specifically, a first inclined surface 222 may be, as shown in FIG. 3b, formed on a side of the fastening protrusion 221, and a second inclined surface 223 may be formed on the bottom surface of the fastening protrusion 221.

Figure 4:
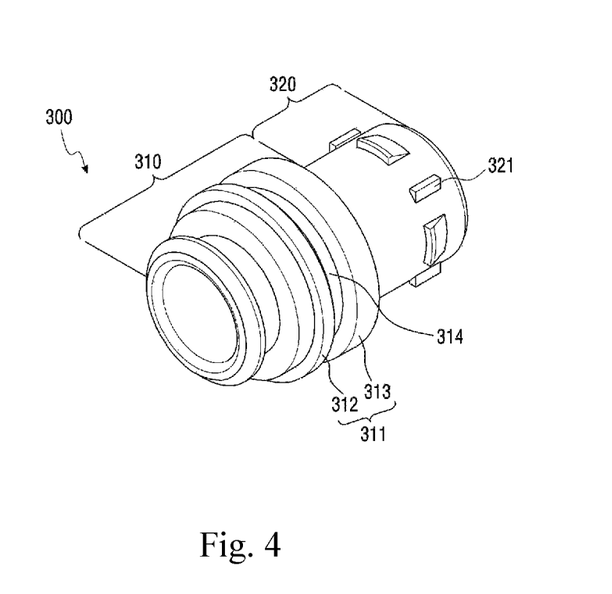
FIG. 4 is a view showing an anchoring socket according to the first embodiment of the present invention.

FIG. 4 is a view showing the anchoring socket according to the first embodiment of the present invention.

Referring to FIG. 4, the anchoring socket 300 is formed to have a cylindrical tubular shape. The cable socket 100 is inserted and pushed into the anchoring socket 300.

The anchoring socket 300 includes a first body 310 and a second body 320.

The first body 310 includes an anchoring portion 311. A bracket anchoring groove 314 having a size sufficient to allow the bracket 600 to be inserted and fixed thereto is formed on the anchoring portion 311. The anchoring portion 311 includes a first anchoring portion 312 and a second anchoring portion 313 which are distinguished by the bracket anchoring groove 314.

The second body 320 includes the locking protrusion 321. The locking protrusion 321 is formed on the second body 320. At least one locking protrusion 321 may be provided. The locking protrusion 321 may be coupled to the below-described protecting member 500. When the locking protrusion 321 is coupled to the protecting member 500, the coupled protecting member 500 is not easily separated from the anchoring socket 300.

The pressing member 400 may be a spring which is formed by winding in the form of a coil a string material having a circular or polygonal cross section. Here, the pressing member 400 is not limited to the spring and includes any member capable of pressing in such a manner as to cause the fastening protrusion 221 to be fastened to the fastening groove 610 of the bracket 600. If the pressing member 400 is a spring, the pressing member 400 may be disposed on the outer circumferential surface of the second body 320 of the anchoring socket 300.

The cable socket 100 may include a guide pipe 110, the anchoring pipe 120, and a damper 130.

The guide pipe 110 has a cylindrical tubular shape. A core (not shown) of a control cable (not shown) is inserted and pushed into the guide pipe 110. The diameter of the guide pipe 110 is less than the inner diameter of the anchoring socket 300 and is inserted into the anchoring socket 300.

The anchoring pipe 120 has a cylindrical tubular shape. An outer of the control cable is inserted and pushed into the anchoring pipe 120. The diameter of the anchoring pipe 120 is less than the inner diameter of the anchoring socket 300 and is inserted into the anchoring socket 300.

The damper 130 connects the guide pipe 110 with the anchoring pipe 120. The diameter of the damper 130 is less than the inner diameter of the anchoring socket 300 and is inserted into the anchoring socket 300. The guide pipe 110 and the anchoring pipe 120 face apart from each other within the damper 130.

Figure 5:
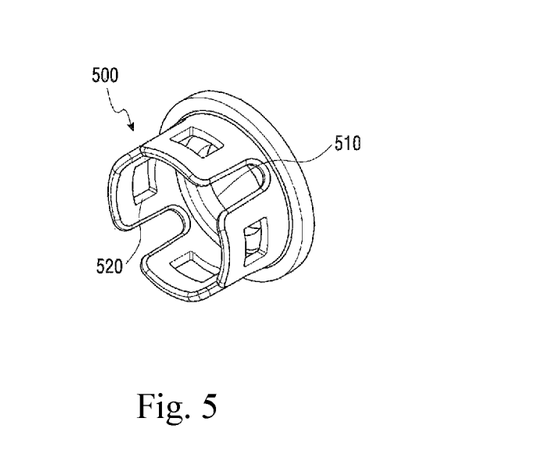
FIG. 5 is a cross sectional view showing a protecting member according to the first embodiment of the present invention.

FIG. 5 is a cross sectional view showing the protecting member according to the first embodiment of the present invention.

The protecting member 500 includes an opening recess 510 and a fastening hole 520.

The opening recess 510 is formed in the protecting member 500, and the cable socket 100 may pass through the opening recess 510. Specifically, the protecting member 500 may be disposed in such a manner as to surround the second body 320 of the anchoring socket 300.

At least one fastening hole 520 may be formed. The fastening hole 520 has a shape corresponding to a locking protrusion 321 of the anchoring socket 300 and is formed at a position corresponding to the locking protrusion 321.

The fastening hole 520 prevents the protecting member 500 from being separated from the anchoring socket 300. Specifically, the fastening hole 520 and the locking protrusion 321 of the anchoring socket 300 are fastened to each other, thereby limiting the movement of the protecting member 500. As a result, it is possible to prevent the protecting member 500 from being separated from the anchoring socket 300.

Also, the protecting member 500 is able to prevent the anchoring socket 300 from being contaminated by dust and contaminants.

Here, when the pressing member 400 is a spring, the pressing member 400 is supported by the anchoring cap 200, the anchoring socket 300, or the protecting member 500. Specifically, one end of the pressing member 400 is supported by one inner side of the anchoring cap 200, and the other end the pressing member 400 is supported by one side of the second body 320 of the anchoring socket 300 or one side of the protecting member 500.

Figure 6:
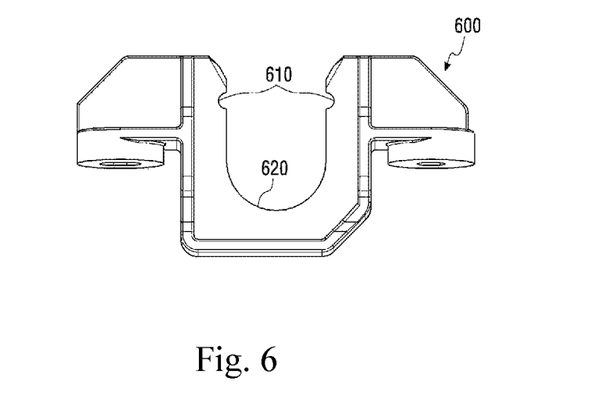
FIG. 6 is a front view of a bracket according to the first embodiment of the present invention.

FIG. 6 is a front view of the bracket according to the first embodiment of the present invention.

In FIG. 6, the bracket 600 may include the fastening groove 610, and a mounting recess 620 may be formed in the bracket 600.

The fastening groove 610 may be formed on both sides of the bracket 600. The fastening groove 610 formed on both sides may have a hemispherical shape allowing the fastening protrusion 221 of the anchoring cap 200 to be fastened thereto.

The bracket anchoring groove 314 of the anchoring socket 300 may be inserted into the mounting recess 620.

FIGS. 7 to 13 are view for describing a process of coupling the cable anchoring device and the bracket according to the first embodiment of the present invention.

Figure 7:
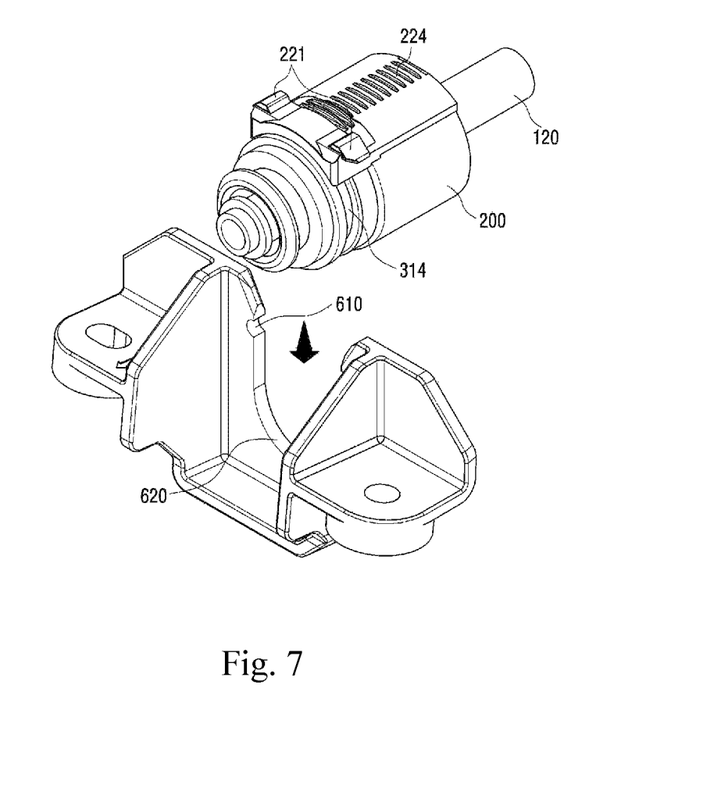
FIGS. 7 to 13 are view for describing a process of coupling the cable anchoring device and the bracket according to the first embodiment of the present invention.
Figure 8:
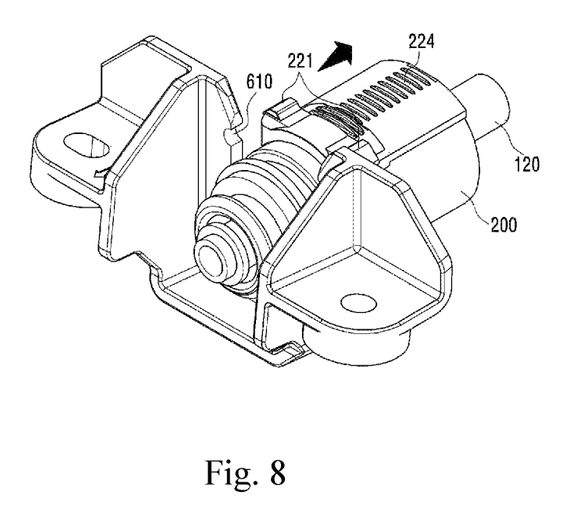
Figure 9:
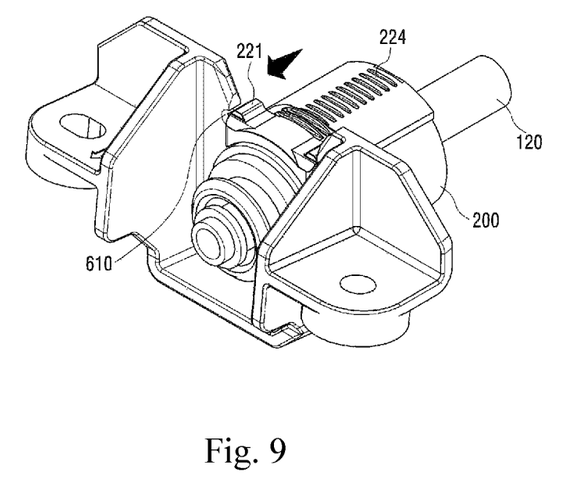

Specifically, FIG. 7 shows that the cable anchoring device has been separated from the bracket. FIG. 8 shows that the cable anchoring device is inserted into the bracket in a state where an external force has been applied to the anchoring cap of the cable anchoring device. FIG. 9 shows that the anchoring cap of the cable anchoring device has been coupled to the bracket.

Figure 10:
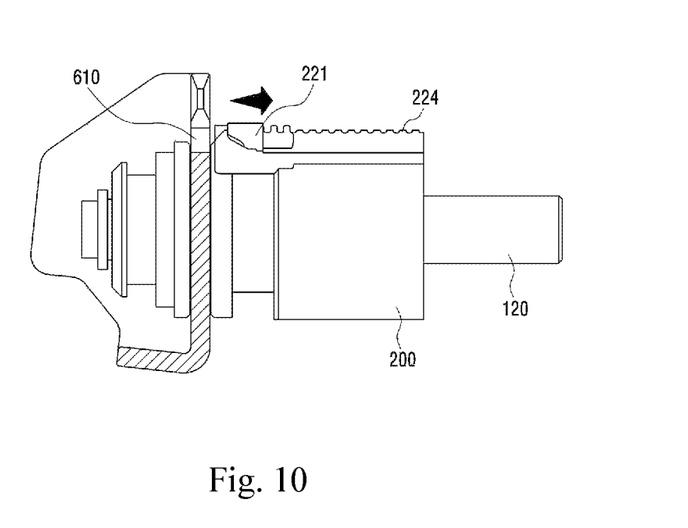
Figure 11:
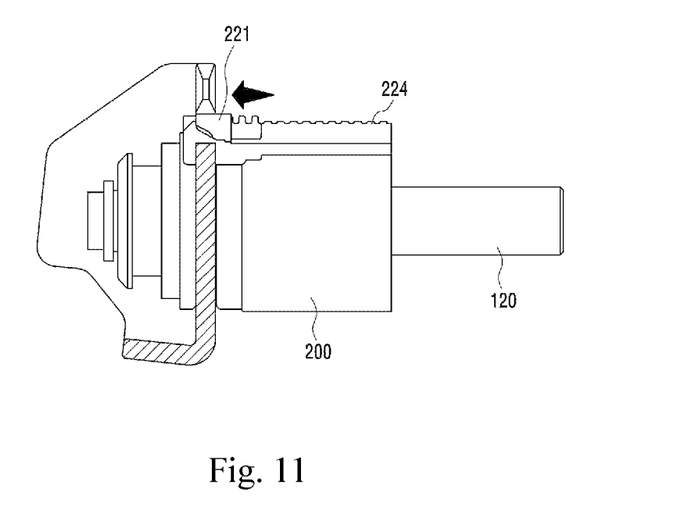

Also, FIG. 10 is a cross sectional view showing that the cable anchoring device is inserted into the bracket in a state where an external force has been applied to the anchoring cap of the cable anchoring device. FIG. 11 is a cross sectional view showing that the anchoring cap of the cable anchoring device has been coupled to the bracket.

Figure 12:
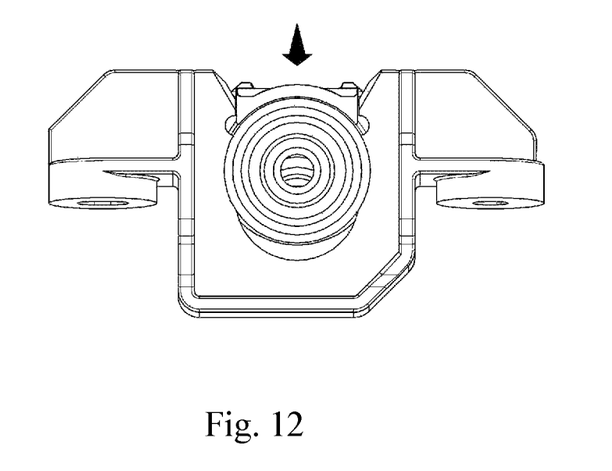
Figure 13:
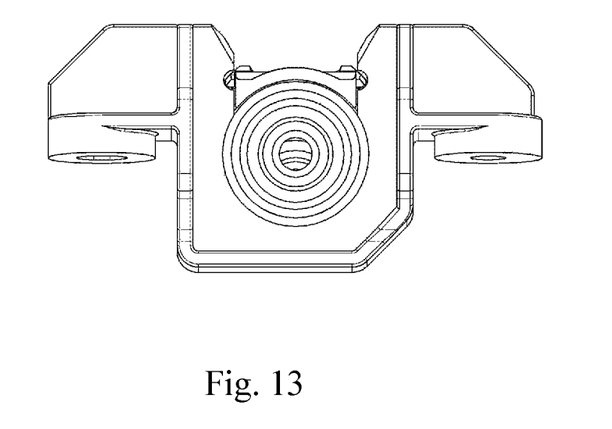

Also, FIG. 12 is a side view showing that the cable anchoring device is inserted into the bracket in a state where an external force has been applied to the anchoring cap of the cable anchoring device when viewed from one side. FIG. 13 is a side view showing that the anchoring cap of the cable anchoring device has been coupled to the bracket when viewed from one side.

As shown in FIG. 7, the cable anchoring device 10 is located above the bracket 600 in a state where no external force is applied to the anchoring cap 200 of the cable anchoring device 10. Here, the bracket anchoring groove 314 of the anchoring socket 300 and the fastening protrusion 221 of the anchoring cap 200 are placed at the same position in a longitudinal direction of the cable anchoring device 10.

Here, since the anchoring cap 200 is rotatable with respect to the anchoring socket 300, the fastening protrusion 221 of the anchoring cap 200 can be easily positioned above the two fastening grooves 610 of the bracket 600 by rotating the anchoring cap 200.

As shown in FIGS. 8, 10, and 12, when an external force is applied to the anchoring cap 200 in a direction of the anchoring pipe 120, the anchoring cap 200 moves toward the anchoring pipe 120, and the bracket anchoring groove 314 of the anchoring socket 300 and the fastening protrusion of the anchoring cap 200 are not placed at the same position in the longitudinal direction of the cable anchoring device 10. The cable anchoring device 10 is easily inserted into the mounting recess 620 of the bracket 600, and the bracket anchoring groove 314 of the anchoring socket 300 is inserted into the mounting recess 620 of the bracket 600.

Here, when the pressing member 400 is a spring, the pressing member 400 is in a compressed state. Therefore, an elastic force is generated in the pressing member 400.

As shown in FIGS. 9, 11, and 13, when the external force applied to the anchoring cap 200 is removed, the anchoring cap 200 returns in a direction of the anchoring portion 311 of the anchoring socket 300 by the elastic force of the pressing member 400.

Meanwhile, when the pressing member 400 is not a spring, the anchoring cap 200 returns in the direction of the anchoring portion 311 of the anchoring socket 300 by applying a separate external force. As a result, the fastening protrusion 221 of the anchoring cap 200 of the cable anchoring device 10 is inserted into the fastening groove 610 of the bracket 600.

Here, even when the position of the fastening protrusion 221 of the anchoring cap 200 is not precisely aligned with the position of the fastening groove 610 of the bracket 600, the first inclined surface 222 or the second inclined surface 223 formed on the fastening protrusion 221 slides while in contact with the fastening groove 610 of the bracket 600, so that the fastening protrusion 221 is inserted into the fastening groove 610.

When the fastening protrusion 221 of the anchoring cap 200 is inserted into the fastening groove 610 of the bracket 600, the upward movement of the cable anchoring device 10 is limited. Also, the forward and backward movements of the cable anchoring device 10 are limited by the first anchoring portion 312 and the second anchoring portion 313 of the anchoring socket 300.

As such, all of the upward, forward and backward movements of the cable anchoring device 10 are restricted. As a result, the cable anchoring device 10 is completely coupled to the bracket 600.

As another way, when the cable anchoring device 10 is located above the bracket 600 and the cable anchoring device 10 moves downward in a vertical direction in the state where the bracket anchoring groove 314 of the anchoring socket 300 of the cable anchoring device 10 and the mounting recess 620 of the bracket 600 are placed at the same position in the longitudinal direction of the cable anchoring device 10, the anchoring cap 200 moves in the direction of the anchoring pipe 120 while a portion of the bracket 600, which corresponds to the upper portion the fastening groove 610, contacts with the first inclined surface 222 or the second inclined surface 223 formed on the fastening protrusion 221 of the anchoring cap 200 of the cable anchoring device 10. Then, the cable anchoring device 10 is fully inserted into the mounting recess 620 of the bracket 600 such that the bracket anchoring groove 314 of the anchoring socket 300 is inserted into the mounting recess 620 of the bracket 600, so that the anchoring cap 200 returns in the direction of the anchoring portion 311 of the anchoring socket 300 by the elastic force of the pressing member 400, and the fastening protrusion 221 of the anchoring cap 200 is inserted into the fastening groove 610 of the bracket 600. As a result, the cable anchoring device 10 and the bracket 600 are completely coupled to each other.

A process of separating the cable anchoring device 10 from the bracket 600 will be described. When an external force is applied to the anchoring cap 200 of the cable anchoring device 10 in the direction of the anchoring pipe 120, the anchoring cap 200 moves in the direction of the anchoring pipe 120. Then, the cable anchoring device 10 is separated upward from the mounting recess 620 of the bracket 600.

Figure 14:
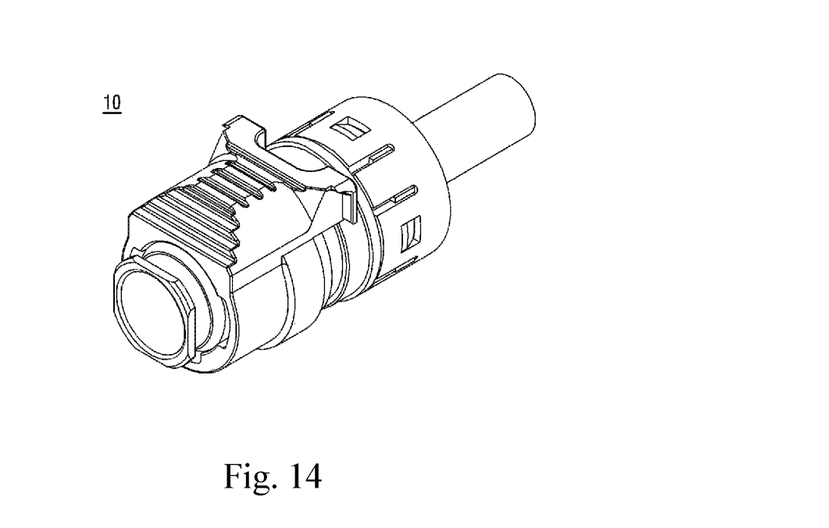
FIG. 14 is a perspective view of a cable anchoring device according to a second embodiment of the present invention.

FIG. 14 is a perspective view of a cable anchoring device according to a second embodiment of the present invention.

Figure 15:
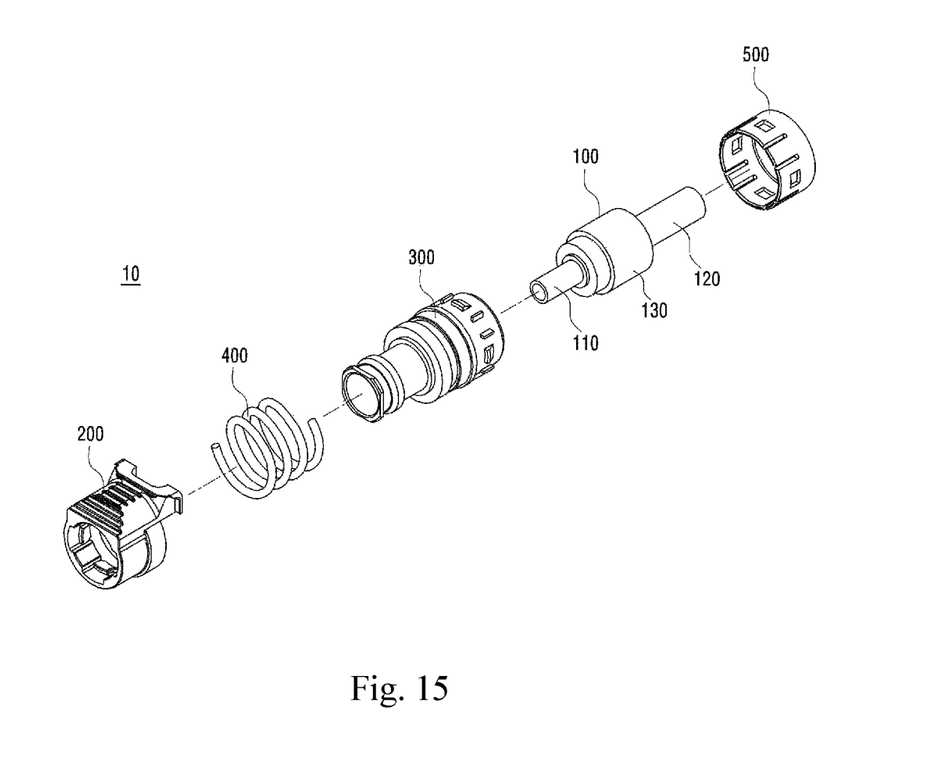
FIG. 15 is an exploded perspective view of the cable anchoring device according to the second embodiment of the present invention.

FIG. 15 is an exploded perspective view of the cable anchoring device according to the second embodiment of the present invention.

Referring to FIGS. 14 and 15, the cable anchoring device 10 according to the second embodiment of the present invention includes an anchoring cap 200, an anchoring socket 300, and a pressing member 400. Also, the cable anchoring device 10 may further include a cable socket 100 and a protecting member 500.

Figure 16A:
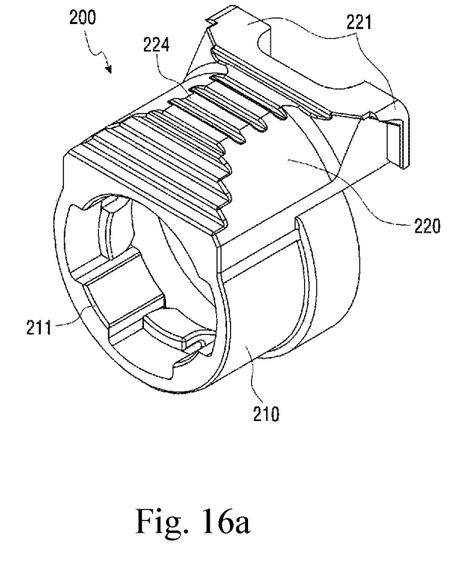
FIGS. 16a, 16b and 17 show an anchoring cap according to the second embodiment of the present invention.
Figure 16B:
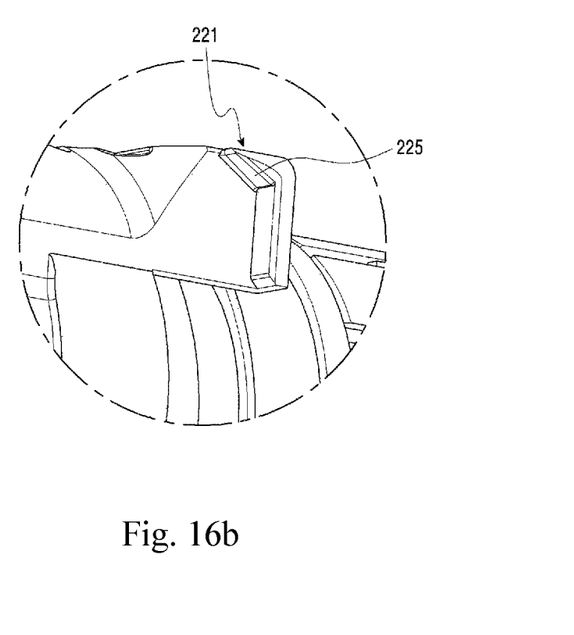
Figure 17:
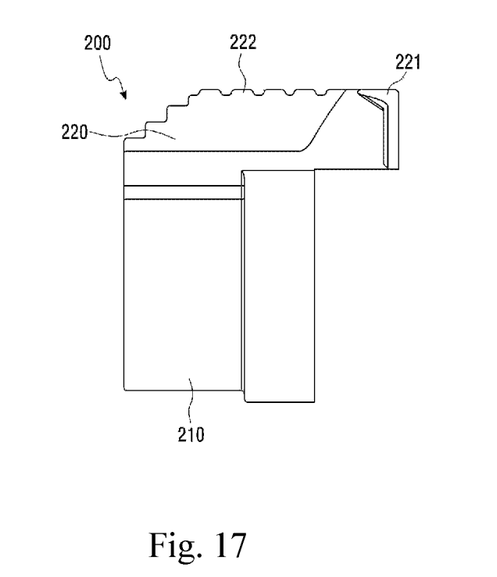

FIGS. 16a, 16b and 17 show the anchoring cap according to the second embodiment of the present invention. Specifically, FIG. 16a is a perspective view of the anchoring cap. FIG. 16b is a view showing an enlarged fastening protrusion. FIG. 17 is a cross sectional view of the anchoring cap.

Referring to FIGS. 16a, 16b, and 17, the anchoring cap 200 is formed to have a donut-like cylindrical shape. A portion of the anchoring socket 300 is inserted into the anchoring cap 200. Here, the pressing member 400 may be disposed between the anchoring cap 200 and the anchoring socket 300.

Specifically, the anchoring cap 200 includes a body 210 and an anchoring portion 220 for the coupling to a bracket 600.

The body 210 includes a fastening hole 211. The fastening hole 211 may be formed to have a shape into which a second body 320 of the anchoring socket 300 is inserted. Accordingly, the body 210 may be disposed in the form of surrounding the second body 320 of the anchoring socket 300.

The anchoring portion 220 may include a fastening protrusion 221. The fastening protrusion 221 may be formed on the rear of the anchoring cap 200 and may have a shape corresponding to a fastening groove 610 of the bracket 600. Through this, the fastening protrusion 221 may be inserted into the fastening groove 610 of the bracket 600.

A groove or projection 224 may be formed on a portion of the outer circumferential surface of the anchoring portion 220 at a regular interval. Therefore, when an external force is applied to the groove or projection 224 formed on a portion of the outer circumferential surface of the anchoring portion 220 for the coupling to the bracket 600, the anchoring cap 200 moves along the direction in which the external force is applied, and when the applied external force is removed, the anchoring cap 200 returns by the elastic force of the pressing member 400 and is fastened to the bracket 600. Here, the outer circumferential surface of the anchoring portion 220 according to the embodiment may have another shape capable of increasing the friction force between the outer circumferential surface and the groove or projection 224.

The fastening protrusion 221 may include at least one inclined surface. Specifically, an inclined surface 225 may be, as shown in FIG. 16b, formed on a side of the fastening protrusion 221.

Figure 18:
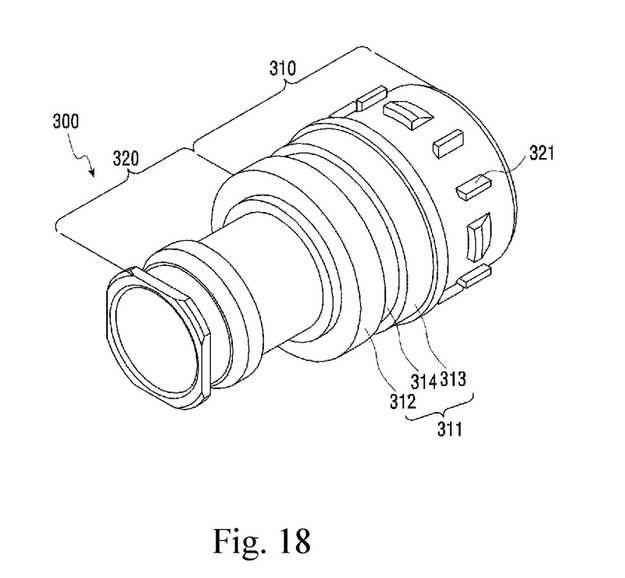
FIGS. 18 and 19 show an anchoring socket according to the second embodiment of the present invention.
Figure 19:
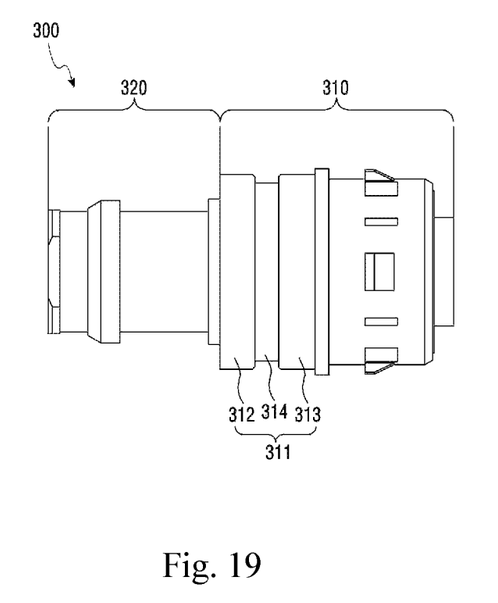

FIGS. 18 and 19 show the anchoring socket according to the second embodiment of the present invention. Specifically, FIG. 18 is a perspective view of the anchoring socket. FIG. 19 is a cross sectional view of the anchoring socket.

Referring to FIGS. 18 and 19, the anchoring socket 300 is formed to have a cylindrical tubular shape. The cable socket 100 is inserted and pushed into the anchoring socket 300.

The anchoring socket 300 includes a first body 310 and the second body 320.

The first body 310 includes an anchoring portion 311 and a locking protrusion 321.

A bracket anchoring groove 314 having a size sufficient to allow the bracket 600 to be inserted and fixed thereto is formed on the anchoring portion 311. The anchoring portion 311 includes a first anchoring portion 312 and a second anchoring portion 313 which are distinguished by the bracket anchoring groove 314.

The locking protrusion 321 is formed on the first body 310. At least one locking protrusion 321 may be provided. When the locking protrusion 321 is coupled to the protecting member 500, the coupled protecting member 500 is not easily separated from the anchoring socket 300.

The second body 320 may be formed to have a cylindrical shape and may be inserted into the fastening hole 211 of the anchoring cap 200.

The pressing member 400 may be a spring which is formed by winding in the form of a coil a string material having a circular or polygonal cross section. Here, the pressing member 400 is not limited to the spring and includes any member capable of pressing in such a manner as to cause the fastening protrusion 221 to be fastened to the anchoring groove 610 of the bracket 600. If the pressing member 400 is a spring, the pressing member 400 may be disposed on the outer circumferential surface of the second body 320 of the anchoring socket 300.

Here, when the pressing member 400 is a spring, the pressing member 400 is supported by the anchoring cap 200 and the anchoring socket 300. Specifically, one end of the pressing member 400 is supported by one inner side of the anchoring cap 200, and the other end the pressing member 400 is supported by one side of the first body 310 of the anchoring socket 300 or one side of the second body 320.

Since the cable socket 100, the protecting member 500, and the bracket 600 are similar to the above-described cable socket 100, the protecting member 500, and the bracket 600 according to the first embodiment, a detailed description thereof will be omitted.

FIGS. 20 to 25 are view for describing a process of coupling the cable anchoring device and the bracket according to the second embodiment of the present invention.

Figure 20:
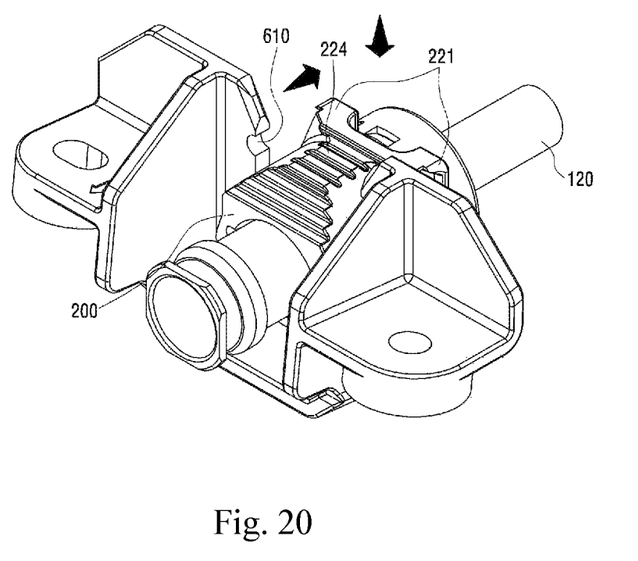
FIGS. 20 to 25 are views for describing a process of coupling the cable anchoring device and the bracket according to the second embodiment of the present invention.
Figure 21:
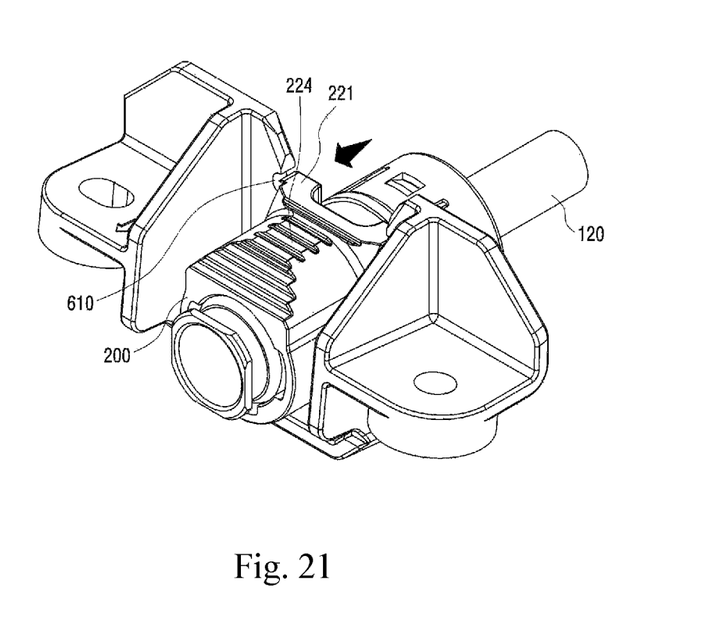

Specifically, FIG. 20 shows that the cable anchoring device is inserted into the bracket in a state where an external force has been applied to the anchoring cap of the cable anchoring device. FIG. 21 shows that the anchoring cap of the cable anchoring device has been coupled to the bracket.

Figure 22:
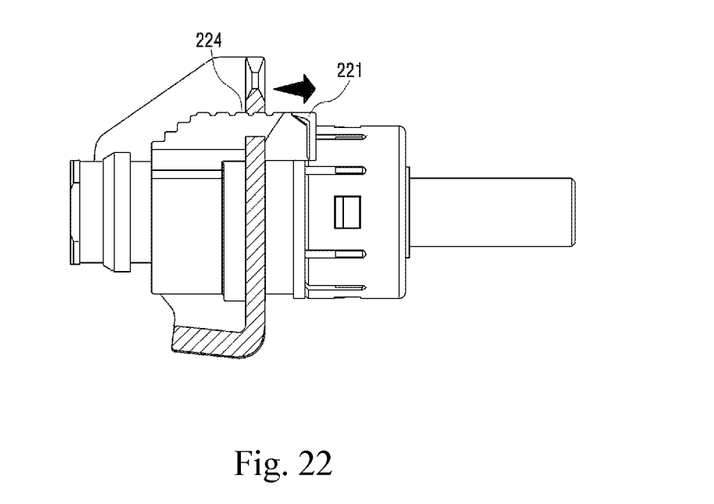
Figure 23:
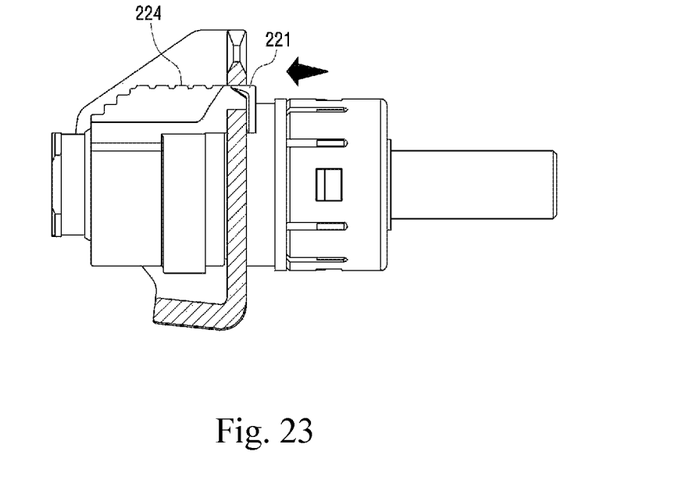

Also, FIG. 22 is a cross sectional view showing that the cable anchoring device is inserted into the bracket in a state where an external force has been applied to the anchoring cap of the cable anchoring device. FIG. 23 is a cross sectional view showing that the anchoring cap of the cable anchoring device has been coupled to the bracket.

Figure 24:
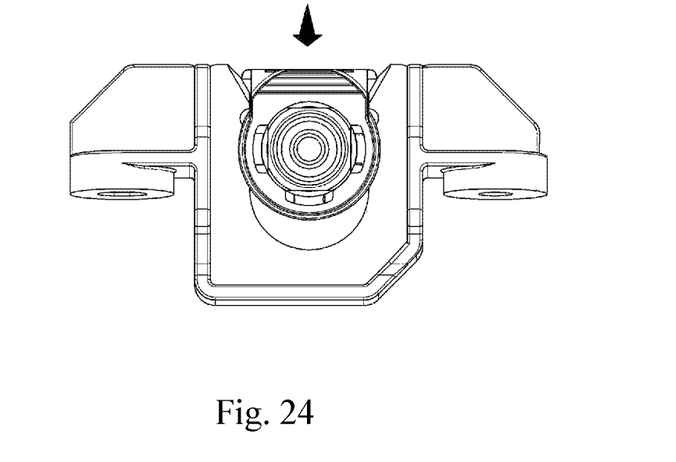
Figure 25:
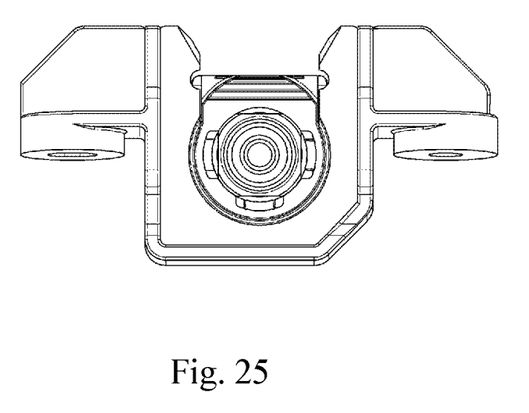

Also, FIG. 24 is a side view showing that the cable anchoring device is inserted into the bracket in a state where an external force has been applied to the anchoring cap of the cable anchoring device when viewed from one side. FIG. 25 is a side view showing that the anchoring cap of the cable anchoring device has been coupled to the bracket when viewed from one side.

As shown in FIGS. 20, 22, and 24, the cable anchoring device 10 is located above the bracket 600, and the bracket anchoring groove 314 of the anchoring socket 300 and the fastening protrusion 221 of the anchoring cap 200 are placed at the same position in the longitudinal direction of the cable anchoring device 10. Subsequently, the fastening protrusion 221 of the anchoring cap 200 is positioned above the two fastening grooves 610 of the bracket 600 by rotating the anchoring cap 200. Then, an external force is applied to the anchoring cap 200 in the direction of the anchoring pipe 120, and the anchoring cap 200 moves in the direction of the anchoring pipe 120. As a result, the cable anchoring device 10 is easily inserted into the mounting recess 620 of the bracket 600.

As shown in FIGS. 21, 23, and 25, when the external force applied to the anchoring cap 200 is removed, the anchoring cap 200 returns in the opposite direction to the second body 320 of the anchoring socket 300 by the elastic force of the pressing member 400. Accordingly, the fastening protrusion 221 of the anchoring cap 200 is inserted into the fastening groove 610 of the bracket 600. As a result, the cable anchoring device 10 and the bracket 600 are completely coupled to each other.

Here, even when the position of the fastening protrusion 221 of the anchoring cap 200 is not precisely aligned with the position of the fastening groove 610 of the bracket 600, the inclined surface 225 formed on the fastening protrusion 221 slides while in contact with the fastening groove 610 of the bracket 600, so that the fastening protrusion 221 is inserted into the fastening groove 610.

As another way, when the cable anchoring device 10 is located above the bracket 600 and the bracket anchoring groove 314 of the anchoring socket 300 of the cable anchoring device 10 and the mounting recess 620 of the bracket 600 are placed at the same position in the longitudinal direction of the cable anchoring device 10. Then, the fastening protrusion 221 of the anchoring cap 200 is positioned above the two fastening grooves 610 of the bracket 600 by rotating the anchoring cap 200. Next, when the cable anchoring device 10 moves downward in a vertical direction, the anchoring cap 200 moves in the direction of the anchoring pipe 120 while a portion of the bracket 600, which corresponds to the upper portion the fastening groove 610, contacts with the inclined surface 225 formed on the fastening protrusion 221 of the anchoring cap 200 of the cable anchoring device 10. Then, the cable anchoring device 10 is fully inserted into the mounting recess 620 of the bracket 600 such that the bracket anchoring groove 314 of the anchoring socket 300 is inserted into the mounting recess 620 of the bracket 600, so that the anchoring cap 200 returns in an opposite direction to the second body 320 of the anchoring socket 300 by the elastic force of the pressing member 400, and the fastening protrusion 221 of the anchoring cap 200 is inserted into the fastening groove 610 of the bracket 600. As a result, the cable anchoring device 10 and the bracket 600 are completely coupled to each other.

A process of separating the cable anchoring device 10 from the bracket 600 will be described. When an external force is applied to the anchoring cap 200 of the cable anchoring device 10 in the direction of the anchoring pipe 120, the anchoring cap 200 moves in the direction of the anchoring pipe 120. Then, the cable anchoring device 10 is separated upward from the mounting recess 620 of the bracket 600.

As such, since the cable anchoring device according to the embodiment of the present invention does not use a separate member, the number of parts can be reduced. Also, since the anchoring cap having the fastening protrusion is rotatable, there is no limit in assembly orientation when the cable anchoring device is fastened to the bracket. Also, since the anchoring cap has a minimum protruding shape including the fastening protrusion, is less transformed and damaged by interference collision. Further, in the cable anchoring device according to the embodiment of the present invention, since the fastening protrusion which is fastened to the bracket includes at least one inclined surface, the cable anchoring device and the bracket can be easily coupled to each other even when the fastening protrusion of the cable anchoring device is not precisely aligned with the fastening groove of the bracket.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A cable anchoring device comprising:
   an anchoring cap which comprises a fastening protrusion for the fastening to a bracket;
   an anchoring socket which comprises a first body in which a bracket anchoring groove is formed, and a second body which is inserted into the anchoring cap; and
   a pressing member which is disposed between the second body and the anchoring cap,
   wherein, when an external force is applied to the anchoring cap, the anchoring cap moves along a direction in which the external force is applied to separate the cable anchoring device from the bracket, and when the bracket is inserted into the bracket anchoring groove the anchoring cap returns by the elastic force of the pressing member so that the fastening protrusion is inserted into a fastening groove of the bracket.

2. The cable anchoring device of claim 1, further comprising a cable socket which passes through the anchoring socket.

3. The cable anchoring device of claim 1, further comprising a protecting member which is inserted into the first body or the second body of the anchoring socket.

4. The cable anchoring device of claim 1, wherein the fastening protrusion comprises at least one inclined surface.

5. The cable anchoring device of claim 1, a groove or a projection is formed on a portion of the outer circumferential surface of the anchoring cap.

* * * * *